United States Patent [19]
Jacobs

[11] Patent Number: 5,270,537
[45] Date of Patent: Dec. 14, 1993

[54] LASER INITIATED ORDANCE SYSTEM OPTICAL FIBER CONTINUITY TEST

[75] Inventor: Richard Jacobs, Brookfield, Mass.

[73] Assignee: Santa Barbara Research Center, Goleta, Calif.

[21] Appl. No.: 87,366

[22] Filed: Aug. 20, 1987

[51] Int. Cl.$^5$ .............................................. H01J 5/16
[52] U.S. Cl. ................................ 250/227.15; 356/73.1
[58] Field of Search ...................... 250/227.11, 227.15, 250/226; 356/73.1

[56] References Cited

U.S. PATENT DOCUMENTS

| | | | |
|---|---|---|---|
| 4,207,561 | 6/1980 | Steensma | 340/600 |
| 4,385,832 | 5/1983 | Doi et al. | 356/73.1 |
| 4,403,143 | 9/1983 | Walker et al. | 250/227 |
| 4,523,092 | 6/1985 | Nelson | 250/231 R |
| 4,685,799 | 8/1987 | Brininstool | 356/73.1 |
| 4,708,471 | 11/1987 | Beckmann et al. | 356/73.1 |

Primary Examiner—David C. Nelms
Attorney, Agent, or Firm—W. C. Schubert; W. K. Denson-Low

[57] ABSTRACT

An apparatus is disclosed for testing the integrity of an optical fiber (23) from a single end of the fiber. A test light source (34) with a wavelength that is different from the primary light source (14) is directed into one end of the optical fiber (23). A spectrally selective dichroic material (32) is attached to the other end of the optical fiber (23). This material (32) transmits light of the wavelength of the primary light source (14) and reflects light of the wavelength of the test light source (34). A break or discontinuity in the optical fiber (23) can be detected by an attenuation in a pulse of light from the test light source (34) after it is transmitted though the optical fiber (23) and reflected back out of the optical fiber (23) by the dichroic material (32). This system can detect breaks or discontinuities in the optical fiber (23) with a high degree of resolution.

15 Claims, 2 Drawing Sheets

LASER INITIATED ORDANCE SYSTEM OPTICAL FIBER CONTINUITY TEST

This invention was made with Government support under Contract No. F04704-85-C-0092 awarded by the Department of the Air Force. The Government has certain rights in this invention.

BACKGROUND OF THE INVENTION

1. Field of the Invention

This invention relates generally to fiber optic continuity test systems and specifically to a single-ended tester capable of detecting discontinuities in an optical fiber with a high degree of resolution.

2. Description of Related Art

Fiber optic continuity test systems are usually either single ended or dual ended. Dual ended systems require access to both ends of the optical fiber to measure the amount of light transmitted through the optical fiber. However, in many applications, access to only one end of the fiber is possible. In such systems, single ended testers must be employed.

Many single ended testers utilize optical time domain reflectometry (OTDR). OTDR systems work by first transmitting pulses of light into a fiber and then measuring the light that is reflected back. The time that it takes for the reflected light to return corresponds to the distance it travels along the fiber. This allows the OTDR system to produce a fiber signature. Two types of reflections occur. Pulse reflections are generated at breaks or joints where the light pulse encounters something other than a continuous glass core. Back scatter reflections are generated uniformly along a fiber as the transmitted pulse travels through the fiber. The back scatter signal provides a measurement of fiber attenuation. OTDR systems are frequently used for finding breaks in communication cables which are typically several kilometers long. One-half meter is considered excellent resolution for an OTDR system.

In some systems, where only single ended testers can be used, one meter resolution is not acceptable. Laser initiated ordance systems are one example. In such a system, a break close to the fiber/ordnance interface could not be distinguished from the end of the optical fiber by an OTDR system. For example, a break only a millimeter from the fiber/ordinance interface would disable the laser ordnance system but would not be detected by an OTDR system. This is because an OTDR system would have to resolve spikes in a return signal only 67 picoseconds apart to distinguish two reflections originating one millimeter apart. Current OTDR systems cannot achieve this resolution.

A further discussion of fiber optic testing systems may be found in M. Bininstool, "Integrated OTDR/-Throughout Loss Measurement System for Environmental Testing of Cabled Optical Fibers" in S.P.I.E., Volume 559, *Fiber Optics: Short-haul and Long-haul Measurements and Applications II*, (1985), and R. Dupuy, "The Present and Future OTDR" in S.P.I.E., Volume 559, *Fiber Optics: Short-haul and Long-haul Measurements and Applications II*, (1985).

Thus, it would be desirable to provide a single ended method of ascertaining fiber optic link integrity which can distinguish a break close to the fiber end.

SUMMARY OF THE INVENTION

The present invention provides a fiber optic continuity test system which can test the integrity of an optical fiber from a single end of the fiber. In one embodiment of the present invention, a primary light source, for example, a primary laser in a laser initiated ordnance system, is directed into one end of an optical fiber. A secondary light source, for example, a test laser, also directs light into the same end of the optical fiber. The secondary light source has a wavelength that is different from the wavelength of the primary light source. The optical fiber is covered on its opposite end by a material which reflects the wavelength of light from the test light source and transmits the wavelength of the primary light source. For example, this may be a dichroic coating.

In the test mode, the primary light source is decoupled from the optical fiber and the secondary light source is coupled to the fiber. The secondary light source then generates a pulse of light into the end of the optical fiber. This pulse is transmitted through the length of the optical fiber and is reflected by the dichroic coating at the opposite end of the fiber. A photodetector is positioned near the test light source where it can detect the pulse of light that is reflected. If there is a break in the optical fiber, the pulse of light that is reflected back to the photodetector will be of lower intensity than would be expected. This is because less light from the pulse is transmitted through the break to the dichroic coating and also because the pulse is again attenuated as it passes through the break a second time as it travels back toward the detector.

If the amplitude of the detected pulse indicates that the optical fiber has no break, the continuity test is complete. The system is then switched from the test mode to the operating mode. This is accomplished by decoupling the test light source from the optical fiber and coupling the primary light source to the optical fiber. The dichroic coating at the end of the optical fiber will then transmit light at the wavelength of the primary light source without significant reflection or attenuation. The primary light source can then perform its intended function.

BRIEF DESCRIPTION OF THE DRAWINGS

Various other advantages will become apparent to one skilled in the art after reading the following specification and by reference to the drawings in which.

DESCRIPTION OF THE PREFERRED EMBODIMENT

Figure 1:
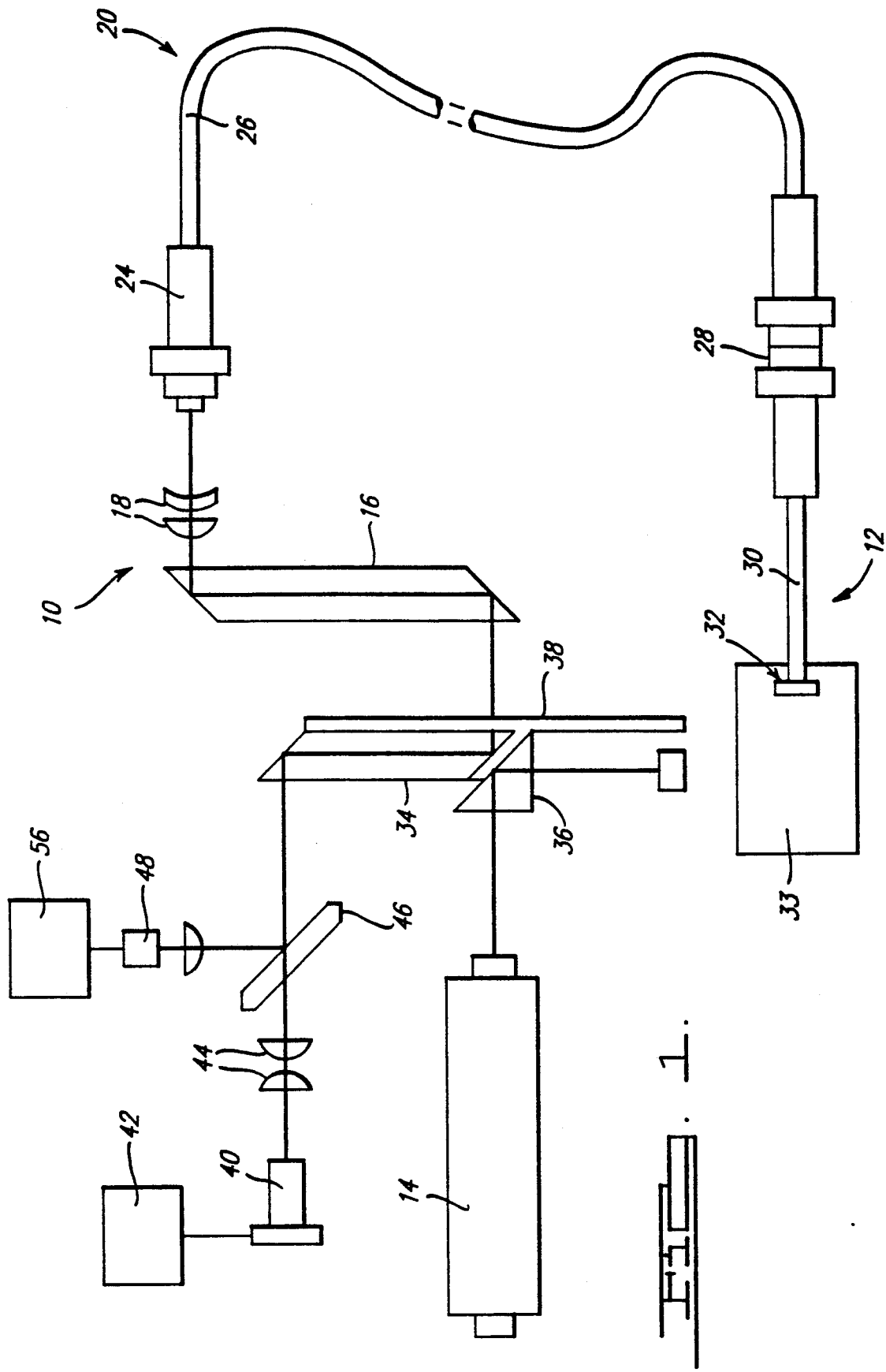
FIG. 1 is a schematic diagram representing a fiber optic continuity test system in accordance with the present invention.

The fiber optic continuity test system 10 is shown in FIG. 1 adapted for use in a laser initiated ordnance system 12. In this embodiment, the laser initiated ordnance system 12 comprises a primary laser 14 which emits light at a wavelength of 1.06 microns. The output energy per pulse of this laser may range from 50 millijoules to 500 millijoules. In the operating mode, a light pulse from the primary laser 14 is directed through a rhomboid prism 16, and then through a set of focusing lenses 18. The focusing lenses 18 focus the light from the primary laser 14 into the optical fiber assembly 20. The optical fiber assembly 20 comprises an optical fiber 22, a connector 24, a second connector 28, a pigtail 30 and a dichroic coating 32.

Figure 2:
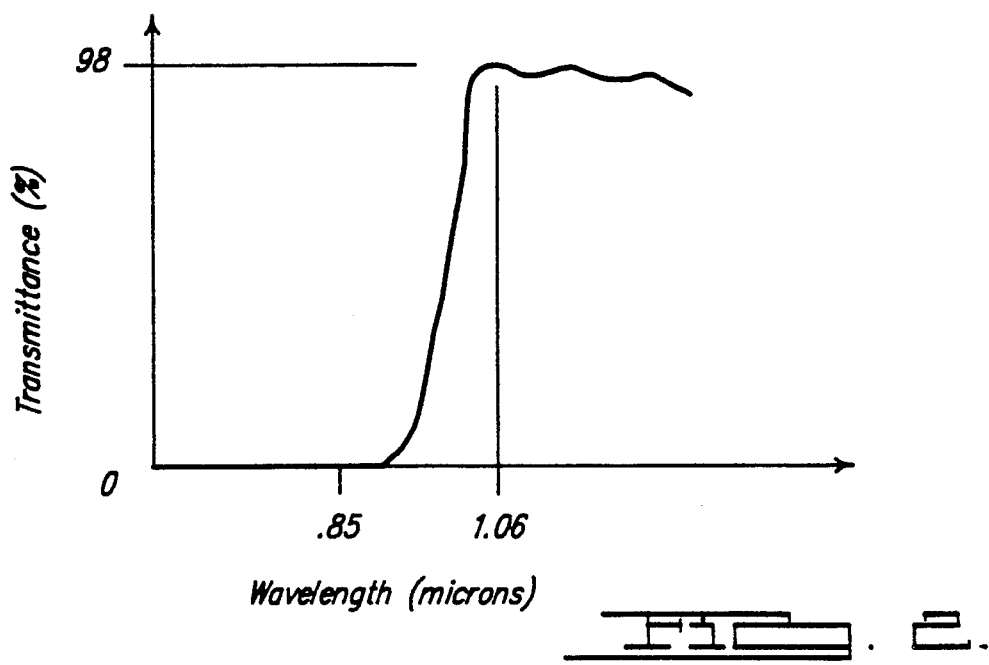
FIG. 2 is a graph of the spectral characteristics of the dichroic coating in the fiber optic continuity test system shown in FIG. 1.

In the preferred embodiment, the dichroic coating 32 is a vacuum deposited multilayer dielectric coating that has high transmittance at the wavelength of the primary laser. This wavelength is 1.06 microns. As shown in FIG. 2, this transmittance is approximately 98 percent. Thus, a high percentage of the energy from the primary laser is transmitted through the dichroic coating to initiate an explosive device 33 shown in FIG. 1. If there are any bad connections or breaks in the optical fiber assembly 20, the laser initiated ordnance system 12 may not work because of attenuation of light from the primary laser 14 at the point of the break or bad connection.

To test the integrity of the optical fiber assembly 20, the fiber optic continuity test system 10 is put into the test mode. This is accomplished by sliding a second rhomboid prism 34, a deviating prisms 36 and a shutter 38 into the path of the light from the primary laser 14 as shown in FIG. 1. In the test mode, light from the primary 20, laser 14 may not enter the optical fiber assembly 20, but light from a test laser 40 is directed into the optical fiber assembly 20. In this embodiment, the test laser 40 is a laser diode with a wavelength between 0.08 microns and 0.88 microns. A pulse generator circuit 42 drives the test laser 40. The test laser 40 then emits a pulse of less than 20 nanoseconds duration with a total energy of about 0.10 nanojoule. This energy level is low enough so that it may safely be employed without risk of initiating the explosive 33.

'Light from the test laser 40 is directed into a set of lenses 44, through a beam splitter 46 and into the rhomboid prism 34. The light is then directed from this prism 34 into the first rhomboid prism 16 and then to focusing lenses 18, which direct the light into the optical fiber assembly 20. After the test light pulse travels through the optical fiber assembly 20, it is reflected by the dicroic coating 32. FIG. 2 illustrates the transmittance of the dicroic coating 32 which is near zero percent for the wavelength of the test laser. Thus, almost all of the light will be reflected by the dichroic coating back through the optical fiber assembly 20 and also through focusing lenses 18, first prism 16, second prism 34 and to beam splitter 46. A portion of this beam is reflected by beam splitter 46 and is directed into a photodiode 48.

Figure 3:
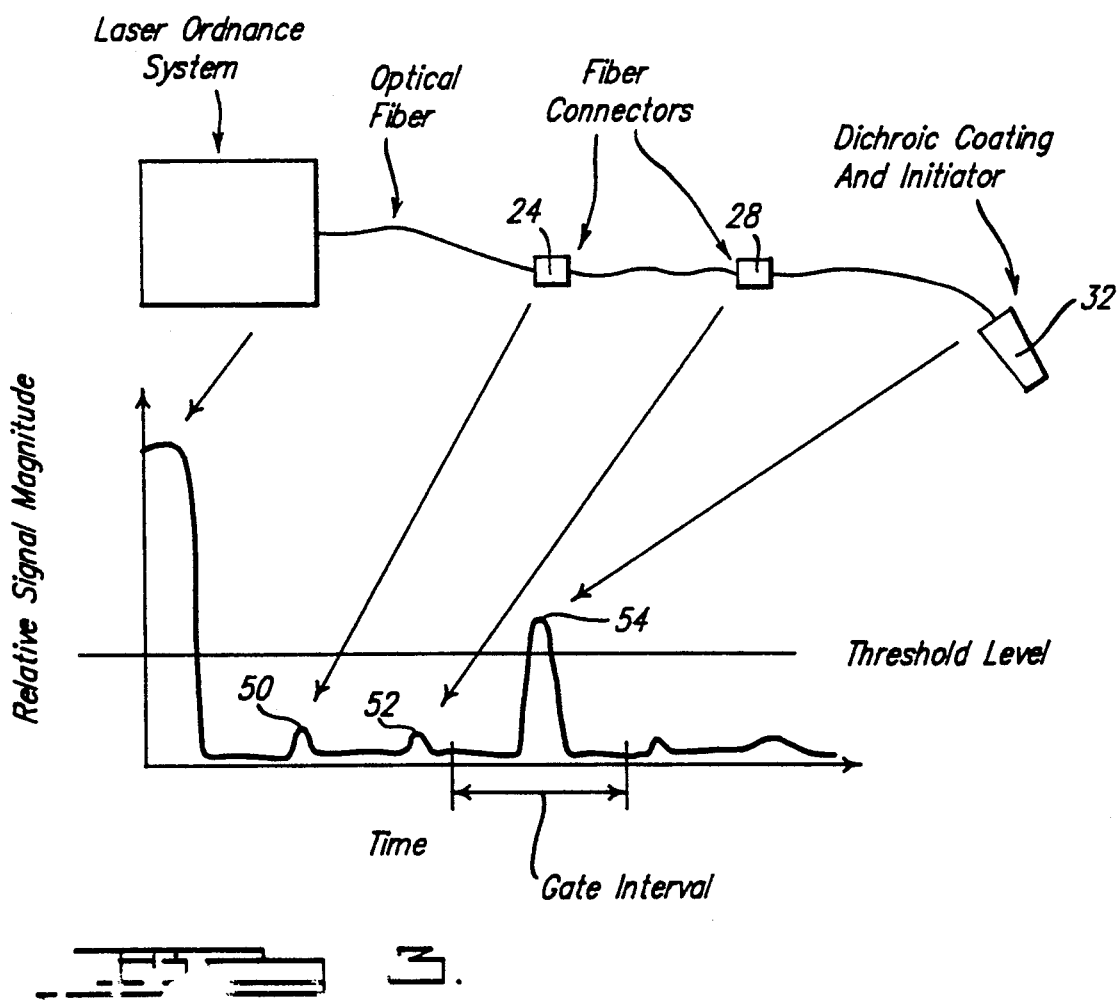
FIG. 3 is a graph of a typical test signal for the fiber optic continuity test system shown in FIG. 1.

An example of the signal detected by the photodiode 48 is shown in FIG. 3. When the test pulse from the laser diode 40 is transmitted into the optical fiber assembly 20, some of the light from this pulse will be reflected by the connectors in the optical fiber assembly 20. For example, connector 24 will reflect a small amount of light back toward the photodiode 48; this will be approximately 3-4% of incident light. This pulse is shown as pulse 50 in FIG. 3. Likewise, connector 28 will reflect some of the light pulse back to the photodiode 42. This pulse 52 is shown also in FIG. 3. Next, the dichroic coating 32 will reflect almost all of the light it receives from the test pulse. This pulse 54 is also shown in FIG. 3. If there were a bad connection or break in the optical fiber assembly 20, much less light would reach dichroic coating 32 and, accordingly, this pulse 54 reflected from the dichroic coating 32 would be much smaller.

In the preferred embodiment, the existence of a break or bad connection in the optical fiber assembly 20 can be detected by first measuring the amplitude of the pulse 54 which is reflected from the dichroic coating in a system where the integrity of the optical fiber assembly 22 is known. A signal level, labeled "threshold level" in FIG. 3, is then chosen slightly below the peak amplitude of the pulse 54. This level may be, for example, 10-20 percent below the peak level.

In actual tests, if a signal from the photodiode 40 equals or exceeds the threshold level, then the fiber optic assembly 20 passes the test. If, on the other hand, the signal from the photodiode 40 is below the threshold level, then the fiber optic assembly 20 fails the test. This would indicate that there was a break or a bad connection in fiber optic assembly 20 because of the attenuation of the test light pulse. It will be appreciated that the detection of the threshold level can be accomplished by a number of electrical level detector circuits which are well known in the art. It may also be useful to limit the detection by this circuit to an interval of time which begins slightly before the pulse 54 is expected to occur, and ends slightly after this pulse is expected to occur. This period of time is labeled "gate interval" in FIG. 3. For example, this gate interval may be $\geq 100$ nanoseconds. Gate interval can be virtually any time period, including "open-ended." The gate can be as narrow as a few hundred nanoseconds in which case only the desired pulse is measured, or open, in which case the total output energy is measured. The detector circuit 56 is shown in FIG. 1.

The above test system eliminates the need for the precise timing measurements that would be required in an OTDR system. Further, this method will detect a break in the optical fiber assembly 20 very close to the end of the optical fiber. This is because attenuation in the test pulse will occur as a result of the break, whether it is near the end of the optical fiber, or elsewhere. OTDR systems, or the other hand, cannot distinguish a break that is, for example, one millimeter away from the end of the optical fiber.

In another embodiment of the present invention, the gate interval shown in FIG. 3 is extended to encompass the time during which all of the reflected pulses would be expected to be received by the photodiode 48. In this embodiment, the total returned energy is measured by integrating all the returned pulses. It will be appreciated that a number of integrating circuits may be used to accomplish this integration which are well known in the art. The integration of all of the return pulses is then compared with the integration for a known good optical fiber. If this summation is significantly below the expected level, the optical fiber contains a break or bad connection and the test is failed.

Those skilled in the art will come to appreciate that other advantages and modifications of the particular example set forth herein are obtainable without departing from the spirit of the invention as defined in the following claims:

What is claimed is:

1. Apparatus for testing the integrity of an optical fiber from a single end of the fiber comprising:
   (a) a primary light source which emits light at a primary wavelength;
   (b) a test light source which emits light at a test wavelength wherein said test wavelength is different from said primary wavelength;

(c) means for directing light from the primary light source into a first end of the optical fiber;

(d) means for directing light from the test light source into the first end of the optical fiber;

(e) means for alternately interrupting light from either the primary light source or from the test light source;

(f) a coating means mounted on the second end of the optical fiber, having the property of substantially transmitting light of the primary wavelength and also substantially reflecting light of the secondary wavelength;

(g) means for pulsing the test light source;

(h) means for detecting pulses of light from the test light source which are directed out of the first end of the optical fiber after they are reflected by the reflective and transmissive member; and (i) means for measuring the intensity of the light pulses detected by the detector means whereby a discontinuity in the optical fiber can be sensed by a reduction in the intensity of the reflected light pulses.

2. The apparatus of claim 1 where the test light source is a low energy laser diode.

3. The apparatus of claim 2 where the laser diode has a wavelength between 0.08 and 0.88 microns.

4. The apparatus of claim 1 where the primary light source is a laser.

5. The apparatus of claim 4 where the optical fiber is coupled to a laser initiatable ordnance and the primary light source is used to trigger an ordnance initiator device.

6. The apparatus of claim 1 where the reflective and transmissive member is a bandpass optical filter.

7. The apparatus of claim 1 where the reflective and transmissive member is a dichroic coating.

8. The apparatus of claim 7 where the dichroic coating is a vacuum deposited multi-layer dielectric coating.

9. The apparatus of claim 1 where the means for alternately interrupting light from either the primary light source comprises a shutter, a rhomboid prism and a deviating prism and a means for introducing the shutter, rhomboid prism and the deviating prism into the path of the light from the primary light source.

10. The apparatus of claim 1 where the means for directing light from the secondary light source comprise:
(a) a first lens assembly for receiving light from the test light source;
(b) a beam splitter for directing light reflected from the optical fiber to the detector means;
(c) a first prism for receiving light from the test light source;
(d) a second prism for receiving light from the first prism; and
(e) a focusing lens assembly for directing light from the second prism into the optical fiber.

11. The apparatus of claim 10 where the means for directing light from the primary light source into a first end of the optical fiber comprises said second prism for receiving light from the primary light source and a focusing lens assembly for directing light from the second prism into the optical fiber.

12. The apparatus of claim 1 where the means for detecting pulses of light from said test light source comprises a photodiode.

13. The apparatus of claim 1 where the means for detecting pulses of light from the test light source further comprises means for detecting light only during a small interval of time during which a pulse reflected from the reflective and transmissive member would be expected to be received and means for determining if the detected pulse is above a predetermined threshold whereby a discontinuity in the optical fiber can be detected by a reduction in the height of this pulse.

14. The apparatus of claim 1 where the means for detecting pulses of light detects light for a relatively wide interval of time during which any light from the pulse reflected from the optical fiber would be expected to be received, said apparatus further comprising:
(a) means for measuring the intensity of light pulses during this relatively wide interval; and
(b) means for integrating the measured intensity during this interval whereby a discontinuity in the optical fiber is detected by a reduction in the value of this integration.

15. Apparatus for testing the integrity of an optical fiber in a laser initiated ordnance system from a single end of the fiber comprising:
(a) a primary light source comprising a laser which emits light at a primary wavelength;
(b) a test light source comprising a low energy laser diode which emits light at a test wavelength wherein said test wavelength is different from said primary wavelength;
(c) means for directing light from the primary light source into a first end of the optical fiber;
(d) means for directing light from the test light source into the first end of the optical fiber;
(e) means for alternately interrupting light from either the primary light source or from the test light source;
(f) a dichroic coating mounted on the second end of the optical fiber, having the property of substantially transmitting light of the primary wavelength and also substantially reflecting light of the secondary wavelength;
(g) means for pulsing the test light source;
(h) a photodiode for detecting pulses of light from the test light source which are directed out of the first end of the optical fiber after they are reflected by the dichroic coating; and
(i) means for measuring the intensity of the light pulses detected by the photodetector during a fixed period of time whereby a discontinuity in the optical fiber can be sensed by a reduction in the intensity of the reflected light pulses.

* * * * *